US012329069B2

(12) United States Patent
Lima de Oliveira Junior et al.

(10) Patent No.: US 12,329,069 B2
(45) Date of Patent: Jun. 17, 2025

(54) STRUCTURAL CHASSIS FOR MOUNTING AN AGRICULTURAL MACHINE AND HARVESTER

(71) Applicant: CNH Industrial America LLC, New Holland, PA (US)

(72) Inventors: José Carlos Lima de Oliveira Junior, Piracicaba (BR); Daenio Cleodolphi, Piracicaba (BR); Marco Aurélio Ramos Pereira, Piracicaba (BR); João Augusto Marcolin Lucca, São Pedro (BR)

(73) Assignee: CNH Industrial America LLC, New Holland, PA (US)

( * ) Notice: Subject to any disclaimer, the term of this patent is extended or adjusted under 35 U.S.C. 154(b) by 818 days.

(21) Appl. No.: 17/613,587

(22) PCT Filed: May 22, 2020

(86) PCT No.: PCT/BR2020/050177
§ 371 (c)(1),
(2) Date: Nov. 23, 2021

(87) PCT Pub. No.: WO2020/232522
PCT Pub. Date: Nov. 26, 2020

(65) Prior Publication Data
US 2022/0232773 A1 Jul. 28, 2022

(30) Foreign Application Priority Data
May 23, 2019 (BR) .......................... 102019010532-1

(51) Int. Cl.
*A01D 45/10* (2006.01)
*A01D 43/08* (2006.01)
*A01D 67/00* (2006.01)

(52) U.S. Cl.
CPC .............. *A01D 67/00* (2013.01); *A01D 45/10* (2013.01)

(58) Field of Classification Search
CPC ........ A01D 45/10; A01D 67/00; A01D 75/28; B62D 21/09; B62D 21/12; B62D 21/18
See application file for complete search history.

(56) References Cited

U.S. PATENT DOCUMENTS

| 4,087,101 A | 5/1978 | Shimazaki et al. |
| 5,031,392 A | 7/1991 | Baker |

(Continued)

FOREIGN PATENT DOCUMENTS

| JP | 2004337036 A | 12/2004 |
| JP | 3833158 B2 | 10/2006 |

(Continued)

OTHER PUBLICATIONS

International Search Report and Written Opinion for PCT Application No. PCT/BR2020/050177 dated Aug. 15, 2020 (11 pages).

*Primary Examiner* — Adam J Behrens
*Assistant Examiner* — Robert E Pezzuto
(74) *Attorney, Agent, or Firm* — Peter K. Zacharias; Rebecca L. Henkel; Rickard K. DeMille

(57) ABSTRACT

A structural chassis for an agricultural machine, such as sugarcane and sweet sorghum harvesters, including a removable reservoir to store hydraulic fluid and, therefore, to improve maintenance and increase the useful life and productivity of the agricultural machine. The structural chassis includes a front portion and a rear portion that supports a primary extractor assembly and a hitch for mounting an elevator assembly. The rear portion is configured to form a processing path through side walls provided with openings for mounting lower and upper feed rollers and chopper rollers. The removable reservoir is installed in a housing formed by the side walls. The removable reservoir (Continued)

includes an opening between the primary extractor assembly and the hitch.

11 Claims, 6 Drawing Sheets

(56) References Cited

U.S. PATENT DOCUMENTS

| | | | |
|---|---|---|---|
| 6,256,454 B1 * | 7/2001 | Dykes | A61G 11/00 |
| | | | 392/403 |
| 7,770,932 B2 | 8/2010 | Lin | |
| 8,240,115 B2 | 8/2012 | Marchini | |
| 10,130,034 B2 * | 11/2018 | Marchesan | A01D 45/10 |

FOREIGN PATENT DOCUMENTS

| | | |
|---|---|---|
| JP | 3884175 B2 | 2/2007 |
| WO | 2019051573 A | 3/2019 |

* cited by examiner

STRUCTURAL CHASSIS FOR MOUNTING AN AGRICULTURAL MACHINE AND HARVESTER

FIELD OF THE INVENTION

The present invention refers, in general, to a new structural chassis for mounting an agricultural machine, such as harvesters for tall and stemmed plants, which was projected to improve the maintenance conditions of these machines and, in particular, of the fluid reservoirs, in order to mainly avoid the risks of leakage during the work.

Furthermore, the present invention also refers to a machine for harvesting tall and stemmed plants, such as a sugarcane harvester, which is assembled on said structural chassis.

BACKGROUND OF THE INVENTION

Several models of agricultural equipment and machines are known to promote increase in the harvest productivity of several types of crops, such as combined harvesters for grain, forages, and also the harvesting machines of the so-called tall and stemmed plants, as in the case of sugarcane and sorghum.

Especially regarding the machines for harvesting such tall and stemmed plants, it is noticed that they are designed and developed to provide the harvest of this particular type of crop, since its inherent characteristics require suitable conditions for their adequate processing, from cutting to transfer to the transshipments and/or trucks.

As should be appreciated by those skilled in the art, this machine model is assembled on the structure of a chassis responsible for supporting practically all the elements, equipment and devices that enable the operation of these machines. Another important function of the chassis of this harvesting machine model is accommodating a set of conveyor rollers and chopper rollers responsible for driving and cut the sugarcane into slugs and, in the rear portion of said chassis, especially below the conveyor and chopper rollers, generally several components and mechanisms of the hydraulic system are installed, such as, for example, hydraulic oil reservoir which is responsible to feed and operate the several equipment, mechanisms and devices of the harvesters.

Typically, these oil reservoirs and other fluids are installed and fixed on the chassis frame, more particularly, they are welded and mounted directly on the chassis and, therefore, it becomes structural elements, including acting as reinforcement of the chassis structure. However, despite of promoting some improvement from a structural point of view, these reservoirs suffer a lot from relatively high stresses and efforts, considering the very severe working conditions that these machines are routinely subjected to and, therefore, it is very common for cracks to appear in the walls of these reservoirs which, consequently, provide fluid leakages, such as hydraulic oil, which substantially affects and compromises the driving and functioning of the different components and mechanisms of these machines.

Another important inconvenience of this prior art chassis model is related to the access for the maintenance of these reservoirs, considering that they are installed in the region below the conveyor rollers and choppers and, as should be noted by those skilled in the art, this part of the machines is quite difficult to access, mainly when it comes to the face facing the rollers which, when needing any maintenance, may require the disassembly of the rollers and other components that are installed in the chassis. As an example, if the reservoir has cracks on the face facing the rollers, the only way to perform maintenance on these cracks is to disassemble practically all the elements that are mounted on the chassis in order to access the damaged reservoir face. This type of maintenance requires the almost complete disassembly of the machine, since said chassis is the structural base of the machine.

Therefore, as should be appreciated by those skilled in the art, although they work, the solutions known in the prior art reveal inconveniences that, in a way, affect the useful life of the machines, but mainly, jeopardize their proper functioning, which may even compromise work in the field, which will certainly be reflected in the results and productivity of plantations and harvests.

Thus, it is quite desirable and interesting to the producers the elimination these kind of risks in which the machine not properly and safely performing its duties due to improper maintenance and, thereby, to promote increase in the productivity of the machines, but mainly ensure its integrity and full functioning. Therefore, this is what is intended to be achieved with the development of the present invention.

DESCRIPTION OF THE INVENTION

Therefore, it is the object of the present invention provides a new structural chassis for a harvesting machine, such as sugarcane harvesters, which comprises technical, constructive and functional features capable of improving maintenance conditions and, therefore, increase the useful life and especially the productivity of these machines.

More particularly, it is one of the objects of the present invention provides a structural chassis for the assembly of a harvester that was designed and developed to accommodate a fluid reservoir that can be easily removed to allow the proper procedures of maintenance.

Another object of the present invention is to provide a harvester, particularly intended for harvesting tall and stemmed crops, such as the sugarcane and the sorghum, which is assembled on a chassis structure as above discussed.

Thus, in order to achieve the technical and functional effects summarized above, among others, the present invention refers to a new structural chassis for the assembly of an agricultural machine, which is basically formed by a front portion and a rear portion, wherein the primary extractor assembly and its respective coupling are fixed in said rear portion for the assembly of the elevator assembly of the agricultural machine. Besides, this rear portion of the structural chassis is configured to form the machine's processing path with the arrangement of side walls provided with openings responsible for assembling the upper and lower conveyor rollers, and openings for assembling the chopper rollers. More particularly, such structural chassis, according to the present invention, comprises at least one removable reservoir that is installed in a housing formed by said side walls, having its opening between the primary extractor assembly and said coupling of the agricultural machine elevator assembly.

According to an embodiment of the present invention, the housing provided in the structural chassis comprises tilting mechanisms connected to said removable reservoir, and these tilting mechanisms can be, for example, pivot points connecting the structural chassis and said removable reservoir. Optionally, these tilting mechanisms can be a platform with electrical and/or hydraulic driving to provide angular movement and linear displacement of said removable reservoir.

Additionally, according to an alternative embodiment of the present invention, said tilting mechanisms can be formed by a set of guides and channels provided in the lower part of the opening of said housing that interact with corresponding guides and channels disposed in the base of the removable reservoir body.

According to another particular embodiment of the present invention, said chassis is formed by a modular structure, said front and rear portions being associated with each other through fastening elements.

Moreover, as another optional embodiment of the present invention, the structural chassis comprises an upper fluid reservoir that is also removable from the rear portion and is fixed against said primary extractor assembly. More particularly, the removable reservoirs according to the present invention are intended for the storage of hydraulic fluid, such as, for example, oil.

As commented above, the present invention also refers to a harvester, such as the type for harvesting tall and stemmed plants, which is formed by a chassis mounted on wheels or tracks, an engine, an operator cabin and at least one extractor assembly, wherein this structural chassis is provided with at least one removable reservoir, and it is configured as mentioned above. More particularly, in accordance to an embodiment of the present invention, this harvester is designed and developed to promote the harvest of sugarcane and/or sweet sorghum.

BRIEF DESCRIPTION OF DRAWINGS

The features, advantages and technical effects of the present invention, as highlighted above, will be better understood, and in the most suitable way for a person skilled in the art, from the following detailed description made merely by way of example and not restrictive, of embodiments of the invention, and with reference to the attached figures, in which.

DESCRIPTION OF EMBODIMENTS OF THE INVENTION

The invention will now be described with respect to its particular embodiments, making reference to the attached figures. Such figures are schematic, and their dimensions and/or proportions may not correspond to the reality, as they are only intended to describe the invention in a didactic way. Furthermore, certain known and common constructive details may have been omitted for clarity and conciseness of the description that follows. Reference numbers used are repeated throughout the figures to identify identical or similar parts. The terms eventually used such as "above", "below", "front", "rear", "right", "left" etc. and its variants should be interpreted according to the guidance represented in FIG. 1.

Figure 1:
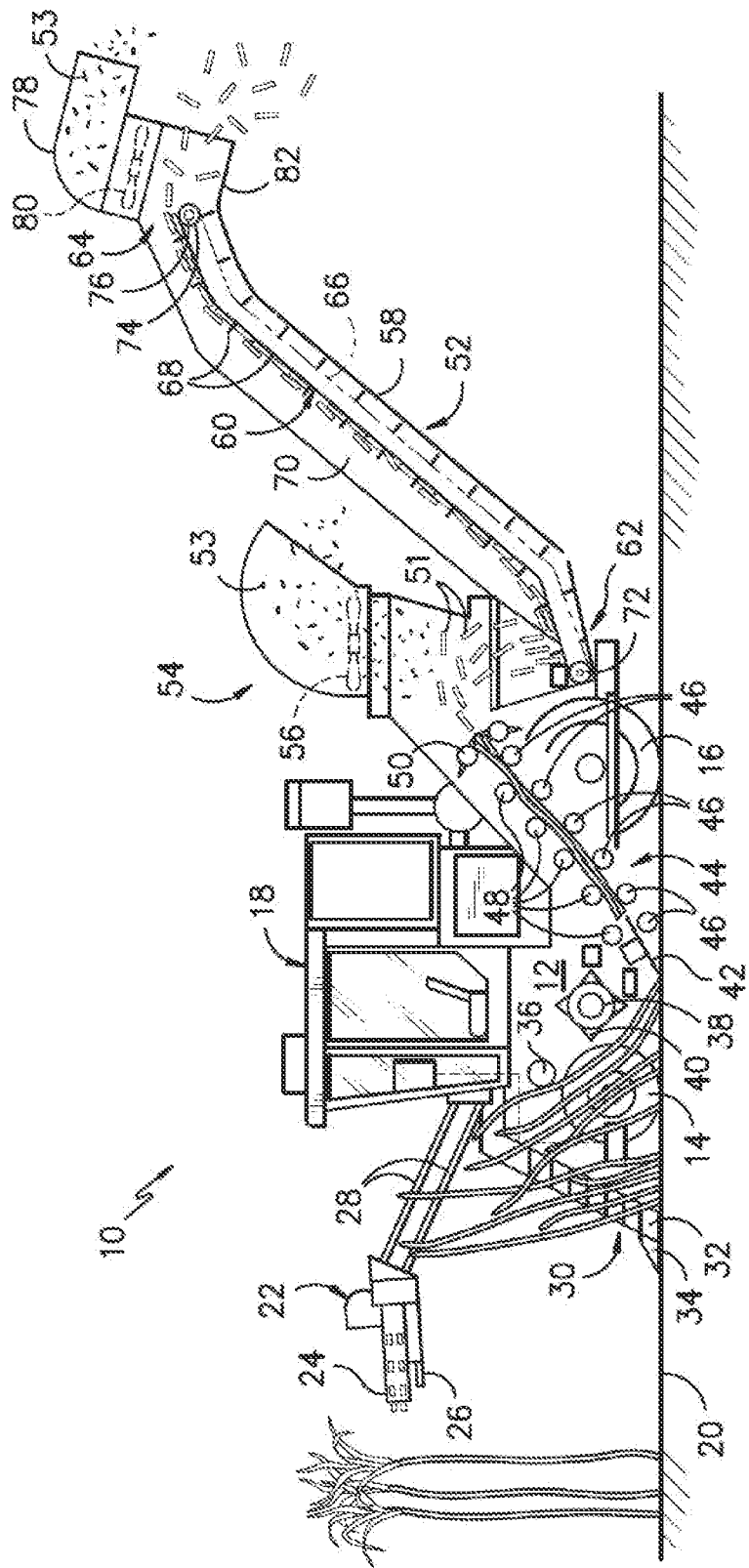
FIG. 1 is a schematic side view of a harvester known in the prior art for harvesting tall and stemmed crops, such as sugarcane and sorghum.
Figure 2:
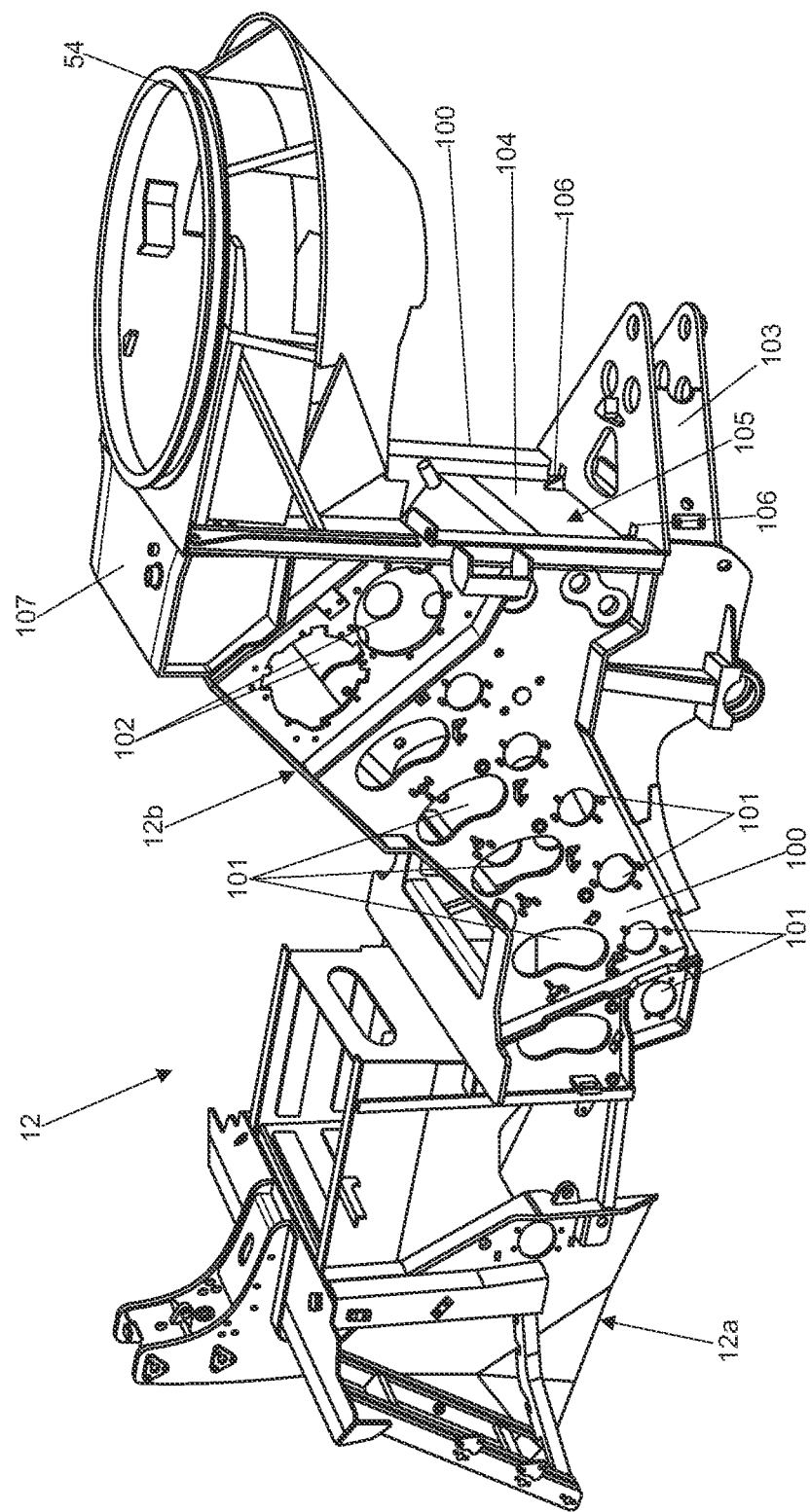
FIG. 2 is a schematic perspective view of a structural chassis for harvesting machines, according to the present invention.
Figure 3A:
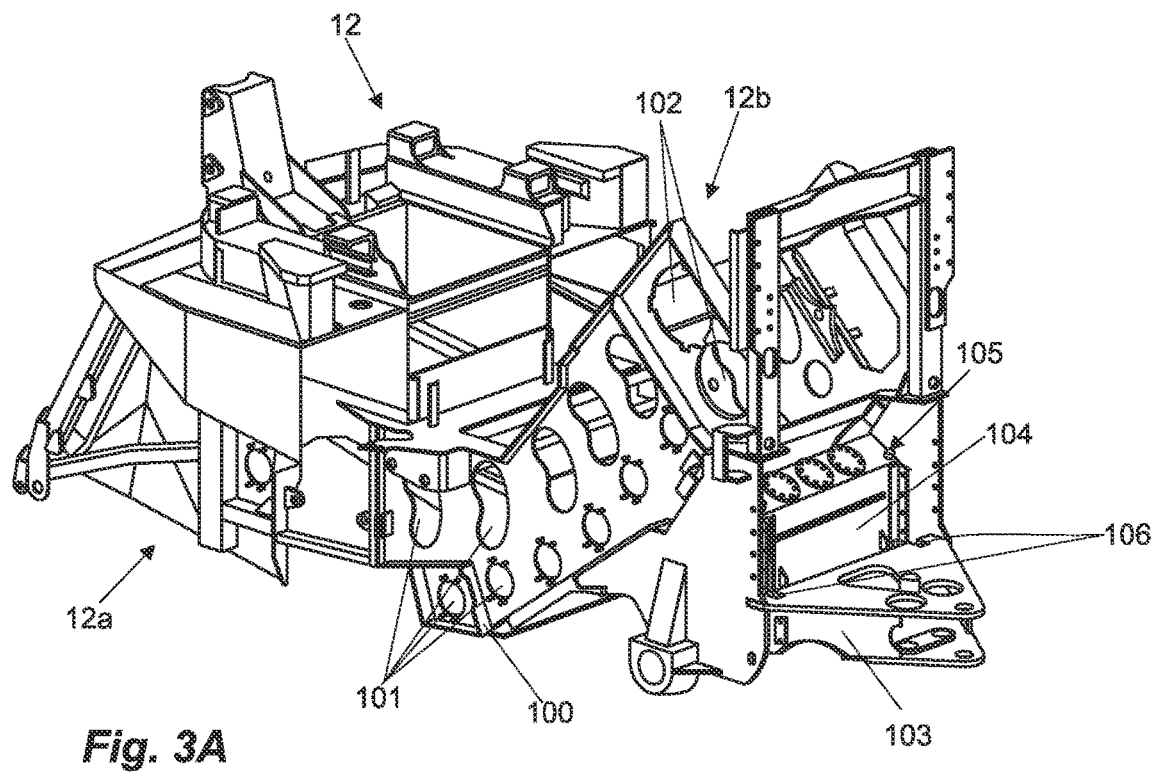
FIGS. 3A, 3B, 3C, 3D and 3E show schematic perspective views representing a sequence of movement of the removable fluid reservoir according to the present invention.
Figure 3B:
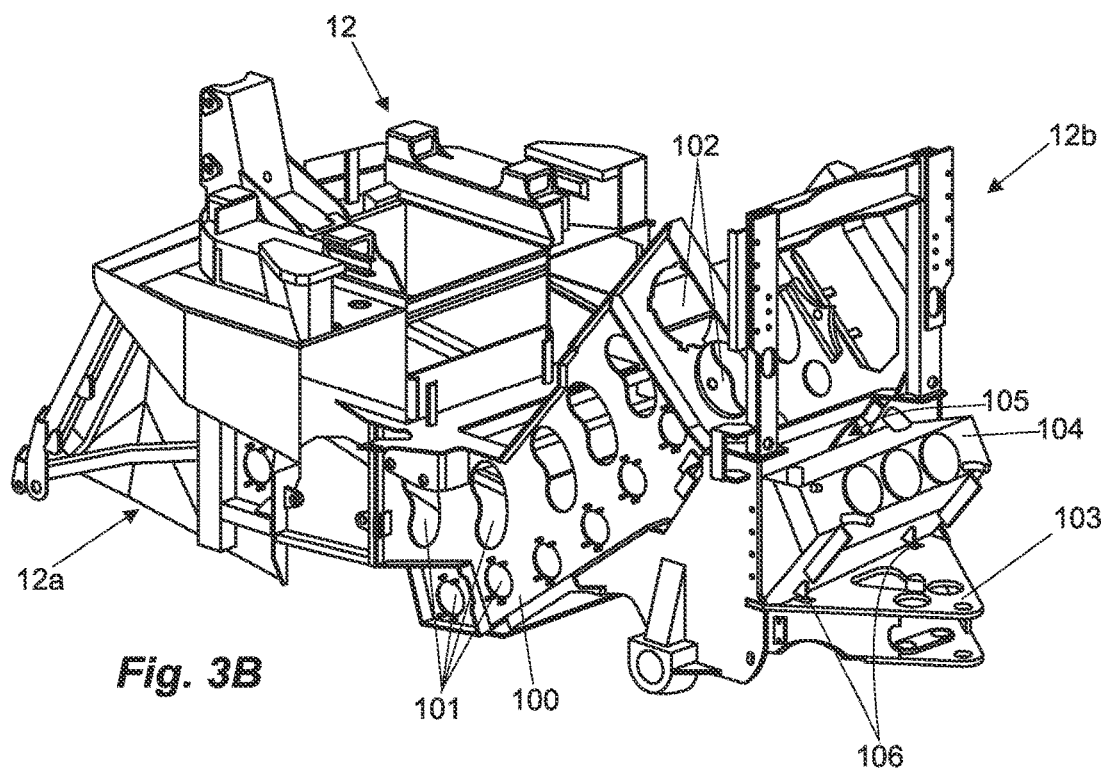
Figure 3C:
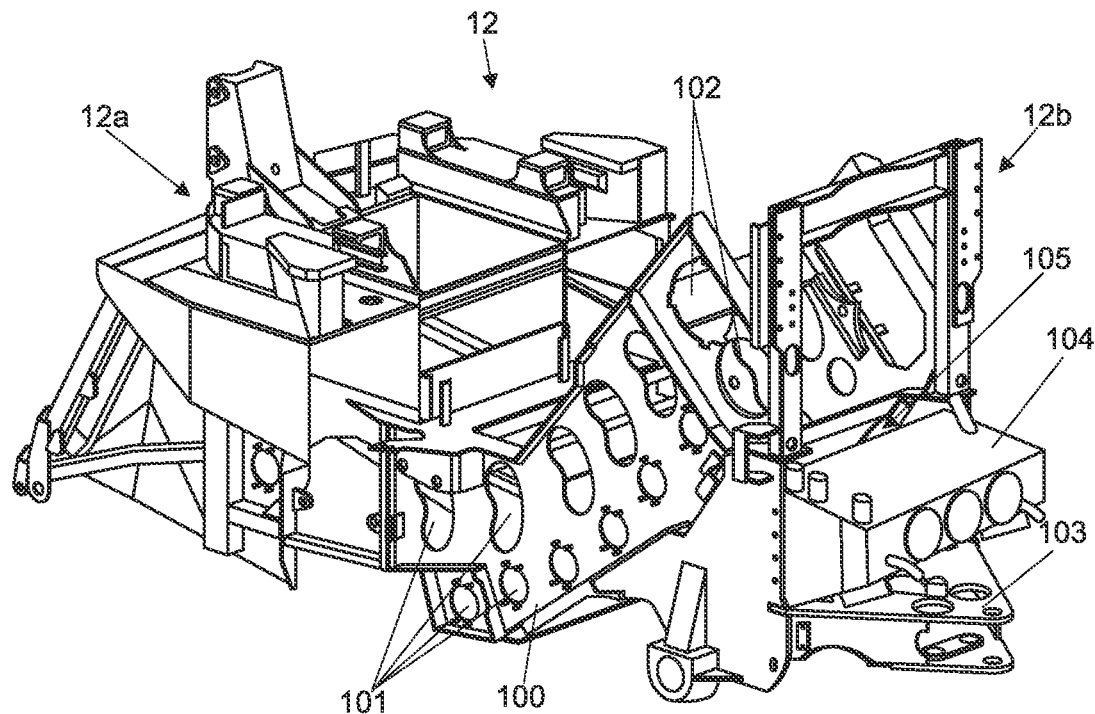
Figure 3D:
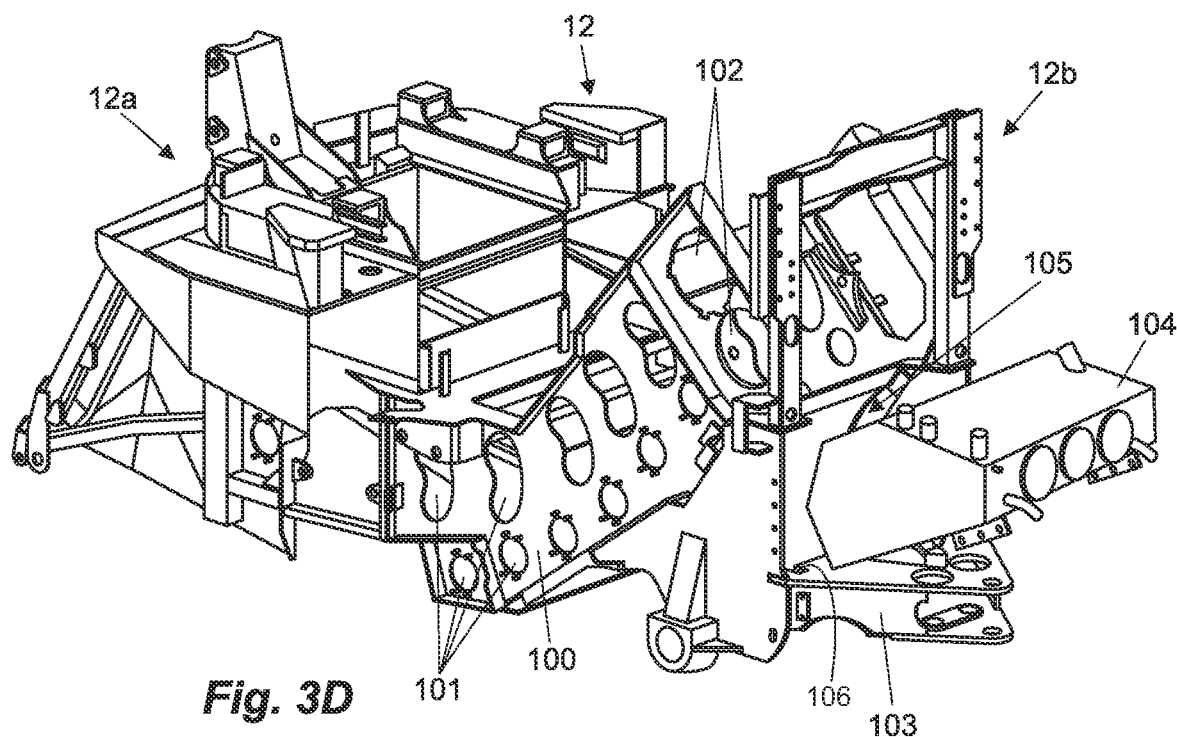
Figure 3E:
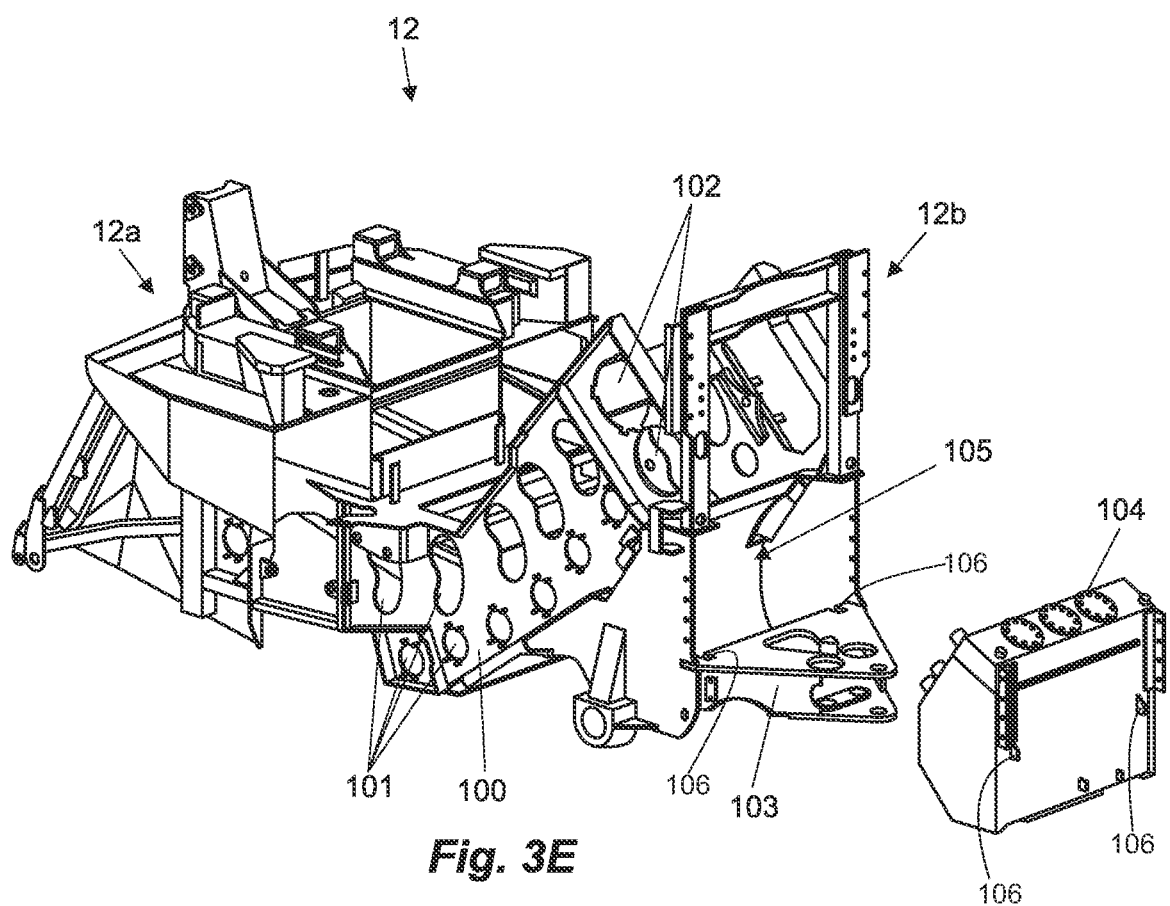

Turning now to the drawings, FIG. 1 illustrates a side view of an embodiment of a harvester 10 according to aspects known in the art. The harvester 10 is configured as a sugarcane harvester. However, in other embodiments, the harvester 10 may correspond to any suitable agricultural harvester known in the art, such as sorghum and energy cane.

As shown in FIG. 1, the harvester 10 includes a chassis 12, a pair of front wheels 14, a pair of rear wheels 16, and an operator cabin 18. The harvester 10 may also include a primary source of power (for example, an engine mounted on chassis 12) that powers one or both pairs of wheels 14, 16 via a transmission (not shown). Alternatively, the harvester 10 may be a track driven harvester and, therefore, may include tracks driven by the motor mechanism in place of the illustrated wheels 14, 16. The motor mechanism may also drive a hydraulic fluid pump (not shown) configured to generate pressurized hydraulic fluid to power various hydraulic components of the harvester 10.

Additionally, the harvester 10 can include several components to cut, process, clean and unload sugarcane as the cane is harvested from an agricultural field 20. For example, the harvester 10 may include a topper assembly 22 positioned at its front end to intercept sugarcane as harvester 10 moves in the forward direction represented by arrow X. As shown, the topper assembly 22 may include both a binder disc 24 and a cuter disc 26. The binder disk 24 may be configured to bind sugarcane stems so that the cutter disk 26 may be used to cut the tip of each stem. Generally, the height of the topper assembly 22 may be adjustable by means of a pair of arms 28 hydraulically raised and lowered as desired by the operator.

Additionally, the harvester 10 may include a crop row divider assembly 30 that extends upwards and backwards from the field 20. In general, the crop row divider assembly 30 may include two spiral feed rollers 32, also known as "lollipop". Each feed roller 32 may include a soil shoe 34 as its lower end assists the crop row divider assembly 30 separating the sugarcane stems for harvesting. In addition, as shown in FIG. 1, the harvester 10 may include a knockdown roller 36 positioned near the front wheels 14 and a roller with projections 38 positioned behind the knockdown roller 36. As the knockdown roller 36 is rotated, the harvested sugarcane stems are tipped over while the crop row divider assembly 30 binds the stems of the agricultural field 20 towards the interior of the machine 10. Additionally, as shown in FIG. 1, the roller with projections 38 may include a plurality of intermittently mounted fins 40 that help in forcing the sugarcane stems down. As roller 38 is rotated during harvesting, the sugarcane stems that have been tipped by knockdown roller 36 are separated and subsequently tipped by roller 38 as harvester 10 continues to move forward with respect to field 20.

Still referring to FIG. 1, the harvester 10 may also include a base cutter assembly 42 positioned behind the roller 38. As is generally understood, the base cutter assembly 42 may include blades (not shown) for cutting the sugarcane stems as the cane is harvested. The blades, located on the periphery of assembly 42, may be rotated by a hydraulic motor (not shown) driven by the vehicle's hydraulic system. Additionally, in several embodiments, the blades may be angled downward to cut the base of the sugarcane as the cane is tipped over by the roller 38.

In addition, the harvester 10 may include a set of one or more conveyor rollers 44 located downstream of the base cutter assembly 42 to move the cut sugarcane stems from the base cutter assembly 42 along the processing path. As shown in FIG. 1, the feed roller assembly 44 may include a plurality of lower rollers 46 and a plurality of upper rollers 48. As the sugarcane is transported through the feed roller assembly 44, waste (e.g., stones, dirt and/or the like) may also be transported or fall through the lower rollers 46 onto the field 20.

In addition, the harvester 10 may include a chopper assembly 50 located at the downstream end of the feed roller assembly 44 (e.g., adjacent to rearmost upper and lower rollers 46, 48). In general, the chopper assembly 50 can be used to cut or chop the harvested sugarcane stems into smaller pieces or "fragments" 51 which may, for example, measure about 15.24 centimeters (six (6) inches).), also called billets or grinding wheels. The fragments 51 may then be propelled towards an elevator assembly 52 of the harvester 10 to be collected in an external receiver or storage device (not shown).

As is generally understood, pieces of waste 53 (e.g., dust, dirt, leaves, etc.) separated from the sugarcane fragments 51 may be expelled from the harvester 10 through a primary extractor assembly 54, which is located behind the chopper assembly 50 and is oriented to direct waste 53 out of the harvester 10. Additionally, a fan 56 can be mounted on the primary extractor 54 to generate sufficient suction force or vacuum to capture the waste 53 and forcing the waste 53 through the primary extractor 54. The waste 53 is then directed outward and generally away from the harvester 10 via an output of the primary extractor 54. The separated fragments 51 are heavier than the waste 53 being expelled from extractor 54, may then fall to elevator assembly 52.

As shown in FIG. 1, the elevator assembly 52 may generally include an elevator housing structure 58 and an elevator 60 that extends within the elevator housing structure 58 between a lower proximal end 62 and an upper distal end 64. In general, elevator 60 may include a chain or conveyor belt 66 and a plurality of paddles or glides 68 coupled or evenly spaced on the chain 66. The glides 68 can be configured to hold the sugarcane fragments 51 in the elevator 60 as fragments 51 are lifted towards the top of the elevator 70. Additionally, the elevator 60 may include lower and upper sprockets 72, 74 positioned around the proximal and distal ends 62, 64, respectively. As shown in FIG. 1, an elevator motor 76 may be coupled to one of the sprockets (e.g., the upper sprocket 74) to drive the chain 66, thus allowing the chain 66 and glides 68 to travel in one endless cycle between the proximal and distal ends 62, 64 of the elevator 60.

In addition, pieces of waste 53 (e.g., dust, dirt, leaves, etc.) separated from the sugarcane fragments 51 may be expelled from the harvester 10 through a secondary extractor assembly 78 coupled to the rear end of elevator structure 58. As shown in FIG. 1, secondary extractor 78 may be located adjacent to distal end 64 of the elevator 60 and may be oriented to direct waste 53 outward from the harvester 10. Additionally, a fan 80 can be mounted in the secondary extractor 78 to generate a suction force or vacuum sufficient to extract the wastes 53 and force the wastes 53 through the secondary extractor 78. The separated fragments 51, heavier than the wastes 53 expelled through the extractor 78, may then fall from distal end 64 of the elevator 60. Typically, fragments 51 may fall through a discharge opening 82 of the elevator assembly 52 into an external storage device (not shown), such as a car, a transshipment, a bucket, etc.

During the operation, the harvester 10 is traveled through the whole agricultural field 20 to harvest sugarcane. After the height of the topper 22 is adjusted (if used) by means of the arms 28, the binder disc 24 in the topper assembly 22 may function to bind the sugarcane ends as the harvester 10 proceeds through the field 20, while cutter disk 26 cuts the hardwood ends of the sugarcane stems to dump them along both sides of the harvester 10. As the stems enter the crop row divider assembly 30, the shoes 34 can set the operation width to determine the amount of sugarcane entering into the inlet opening of the harvester 10, either fixedly or adjustable. The lollipops 32 then bind the stems at the entrance of the machine to allow the knockdown roller 36 to bend the stems down in conjunction with the action of the feed roller 38. Since the stems are positioned at an angle as shown in FIG. 1, the base cutter assembly 42 may then cut the base of the field stems 20. The cut stems are then directed to the feed roller assembly 44.

The cut sugarcane stems are transported backwards by the feed rollers 46, 48 which compress the stems and the harvested matter. At the downstream end of the feed roller assembly 44, the chopper assembly 50 cuts or chops the compacted sugarcane stems into pieces or fragments 51. Transported waste 53 (e.g., dust, dirt, leaves, etc.) separated from the sugarcane fragments 51 are then extracted through the primary extractor assembly 54 using the suction or vacuum created by the fan 56. The separated/washed fragments 51 then fall to the elevator assembly 52 and travel upward via elevator 60 from its proximal end 62 to the distal end 64. During normal operation, once the fragments 51 reach the distal end 64 of the elevator 60, the fragments 51 fall through the discharge opening 82 to an external storage device. Similar to primary extractor 54, wastes are blown out of the harvester 10 through secondary extractor assembly 78 with the aid of the fan 80.

A harvester 10 as described above may be a sugarcane harvester that can be built and assembled on a structural chassis, according to the present invention, and said harvester 10 may be, for example, a machine known in the art, such as those CNH Industrial N.V.'s sugarcane harvesters sold under the brand Case IH.

The terms referred herein as harvester, collector and their variants are used interchangeably to designate a machine for harvesting crops in general.

According to the other figures, it is possible to observe that the structural chassis 12 is formed by a front portion 12a and a rear portion 12b, and the front portion 12a is intended for the assembly of the operator's cabin 18 and the binding mechanisms of tipping and cutting the plant stems, and while said rear portion 12b supports the primary extractor assembly 54, and is configured to form the machine processing path so that its side walls 100 are provided with openings 101 for assembling the lower 46 and upper 48 feed rollers, and openings 102 for mounting the chopper rollers 50. In addition, the lower end of the rear portion 12b, below said primary extractor assembly 54, is provided with a hitch 103 for coupling and mounting the elevator assembly 52.

Thus, based on the scenario reported above, said structural chassis 12 for the assembly of an agricultural machine, according to the present invention, further comprises at least one removable reservoir 104 that is installed in a housing 105 formed by side walls 100 and disposed substantially under said chopper rollers 50, the opening of said housing 105 being positioned between the primary extractor assembly 54 and said hitch 103 of the elevator assembly 52 to thereby provide the removal and installation of said removable reservoir 104 in a simple way and without the need to disassemble the set of feed rollers and chopper rollers.

According to one embodiment of the present invention, and as depicted in FIGS. 3A-3D, said housing 105 may comprise a tilting mechanism 106 of the removable reservoir 104 so that the maintenance technician may perform service in a simplified way, wherein this tilting mechanism can be mere pivot points that make the connection between said chassis 12 and the removable reservoir 104, as well as more complex mechanisms, such as an electric and/or hydraulic platform capable of promoting the angular movement and the linear displacement of the reservoir for removal and replacement it within said housing 105, requiring less efforts on the part of the technicians.

Optionally, these tilting mechanisms 106 may also be formed by a set of guides and channels provided at the bottom of the housing opening 105 that interact with corresponding guides and channels provided at the base of the reservoir body, which can facilitate the orientation and positioning of the removable reservoir 104 during the inlet and outlet movement, eliminating the risks of jamming or improper installation of the reservoir inside the housing.

Figure 4A:
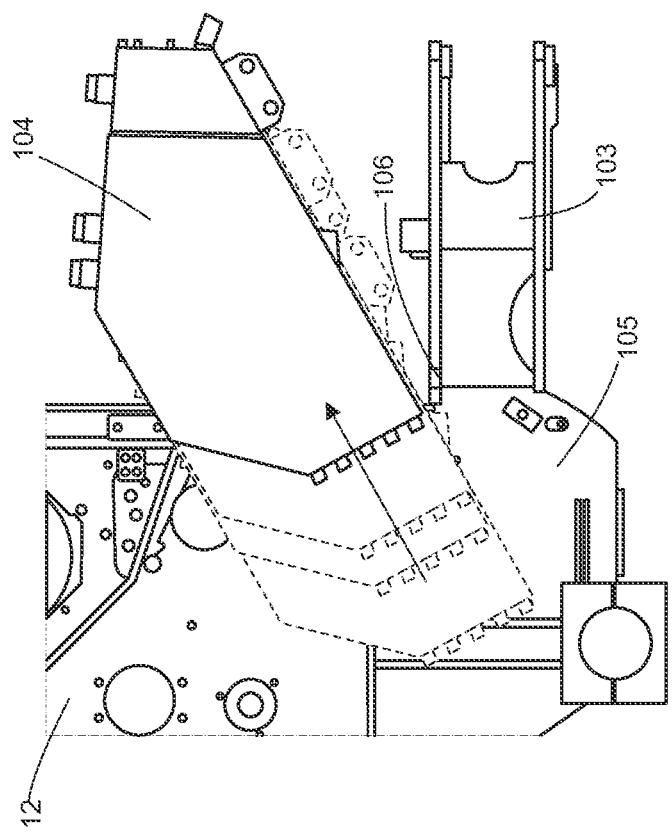
FIGS. 4A and 4B show schematic side views that represent the withdrawal movement of the removable fluid reservoir, according to the present invention.
Figure 4B:
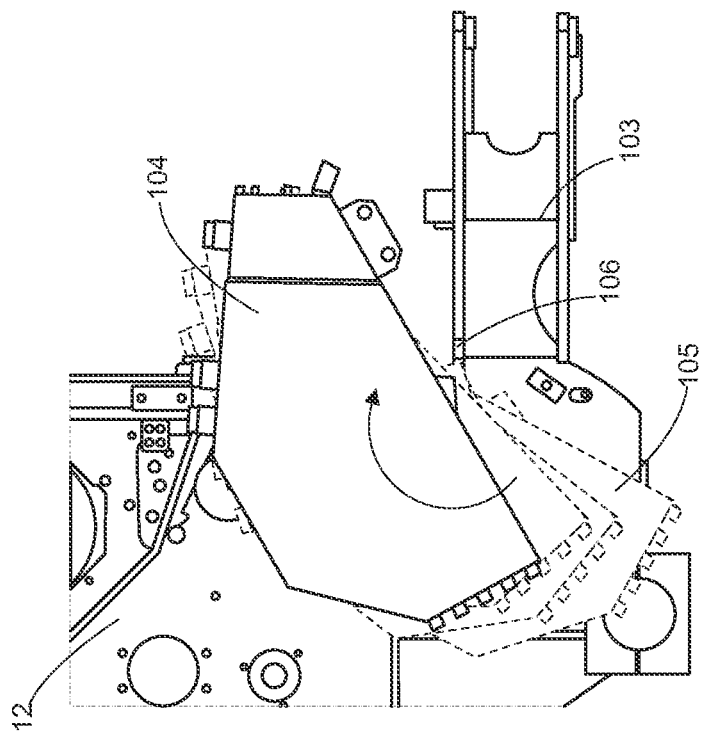

FIGS. 4A and 4B schematically show the outflow movement of the removable fluid reservoir 103. More particularly, it is observed that initially the maintenance technician rotates the removable reservoir 103, as indicated by the arrow in FIG. 4A and subsequently, the removable reservoir 103 can be pulled out linearly from the housing 105, as indicated by the arrow in FIG. 4B. As can be seen by the person skilled in the art, the installation process of the reservoir 103 within the housing 105 occurs in reverse manner, that means, initially the reservoir 103 is linearly displaced into the housing and, subsequently, rotated for proper positioning and locking in the housing 105.

Additionally, said chassis 12 may be a modular structure, so that the front 12a and rear 12b portions are associated through fastening elements. As should be appreciated by a person skilled in the art, this type of construction provides several benefits to manufacturers by simplifying production lines, but also promotes significant results for machine owners, considering the ease of performing maintenance on the modules individually.

Optionally, in cases where the machines are provided with an upper fluid reservoir 107, this can also be installed detachably in the rear portion 12b of the chassis 12 and, more specifically, in contrast to the primary extractor assembly 54. However, considering its positioning, it is not necessary to install and use tilting mechanisms, and it can be fixed by any fastening means, such as screws, and it is vertically displaced from the structure without any complexity.

According to the embodiments of the present invention, such removable reservoirs 104 and 107 are intended to storage hydraulic fluid, such as oil, which is pressurized by hydraulic fluid pump (not shown) to drive various components, equipment, and hydraulic mechanisms of the harvester 10.

Additionally, and as anticipated above, the present invention also refers to a harvester 10, particularly intended for harvesting tall and stemmed plants, said machine 10 being built and assembled on a structural chassis 12, which is formed by a front portion 12a and a rear portion 12b, said rear portion 12b comprising at least one removable reservoir 104, which is installed in a housing 105 formed by the chassis side walls 100 and whose opening is positioned between the primary extractor assembly 54 and a hitch 103 of the elevator assembly 52.

According to a more particularly embodiment the present invention, this harvester 10 is designed and developed to perform and process the harvesting of sugarcane and sweet sorghum.

Thus, considering all the exposed above, it is important to highlight that the new structural chassis 12 for the assembly of agricultural machines, according to the present invention, allows for more simplified maintenance procedures, increasing the useful life of these machines, but mainly ensuring the proper and safe operation of all equipment, mechanisms and devices driven and controlled by the hydraulic fluid that is stored in the removable reservoir 104, which can now be subjected to proper maintenance, eliminating any risk of leakages due to cracks formed in its walls.

Finally, based on the above discussion, it is worth to emphasize that the present disclosure aims at only to present and define in exemplary way preferred embodiments of the new structural chassis for the assembly of agricultural machineries, according to the present invention. So, as must be appreciated by the person skilled in the art, several modifications and combinations of elements and details equivalents are possible without, however, be out of the scope of protection defined by the attached claims.

The invention claimed is:

1. A structural chassis for an agricultural machine comprising a primary extractor assembly and an elevator assembly, the structural chassis comprising:
   a hitch;
   a front portion;
   a rear portion for mounting the primary extractor assembly, the hitch being attached to the rear portion for mounting the elevator assembly, the rear portion comprising side walls having first openings for mounting lower and upper feed rollers and second openings for mounting chopper rollers, the side walls forming a housing having an opening between the primary extractor assembly and the hitch; and
   at least one removable reservoir installed in the housing, wherein the rear portion is configured to form a processing path through the side walls.

2. The structural chassis according to claim 1, wherein the housing comprises tilting mechanisms connected to the at least one removable reservoir.

3. The structural chassis according to claim 2, wherein the tilting mechanisms are pivoting points that make a connection with the removable reservoir.

4. The structural chassis according to claim 2, wherein the tilting mechanism is a platform with an electric or hydraulic driving mechanism for angular movement and linear displacement of the removable reservoir.

5. The structural chassis according to claim 2, wherein the tilting mechanisms are formed by a set of guides and channels arranged at a bottom of the opening of the housing which interact with corresponding guides and channels arranged at a base in the at least one removable reservoir.

6. The structural chassis according to claim 1, wherein the front and rear portions are connected through fastening elements.

7. The structural chassis according to claim 1, further comprising an upper fluid reservoir which is also removable from the rear portion and is fixed against the primary extractor assembly.

8. The structural chassis according to claim 7, wherein the at least one removable reservoir and the upper fluid reservoir are intended for storage of hydraulic fluid.

9. A harvester, comprising the chassis according to claim 1 mounted on wheels or tracks, an engine, an operator cabin, and the primary extractor assembly.

10. The harvester according to claim 9, wherein the harvester is configured for harvesting sugarcane or sweet sorghum.

11. The structural chassis according to claim 1, wherein the at least one removable reservoir is disposed between the sidewalls of the rear portion.

\* \* \* \* \*